Figure 1:
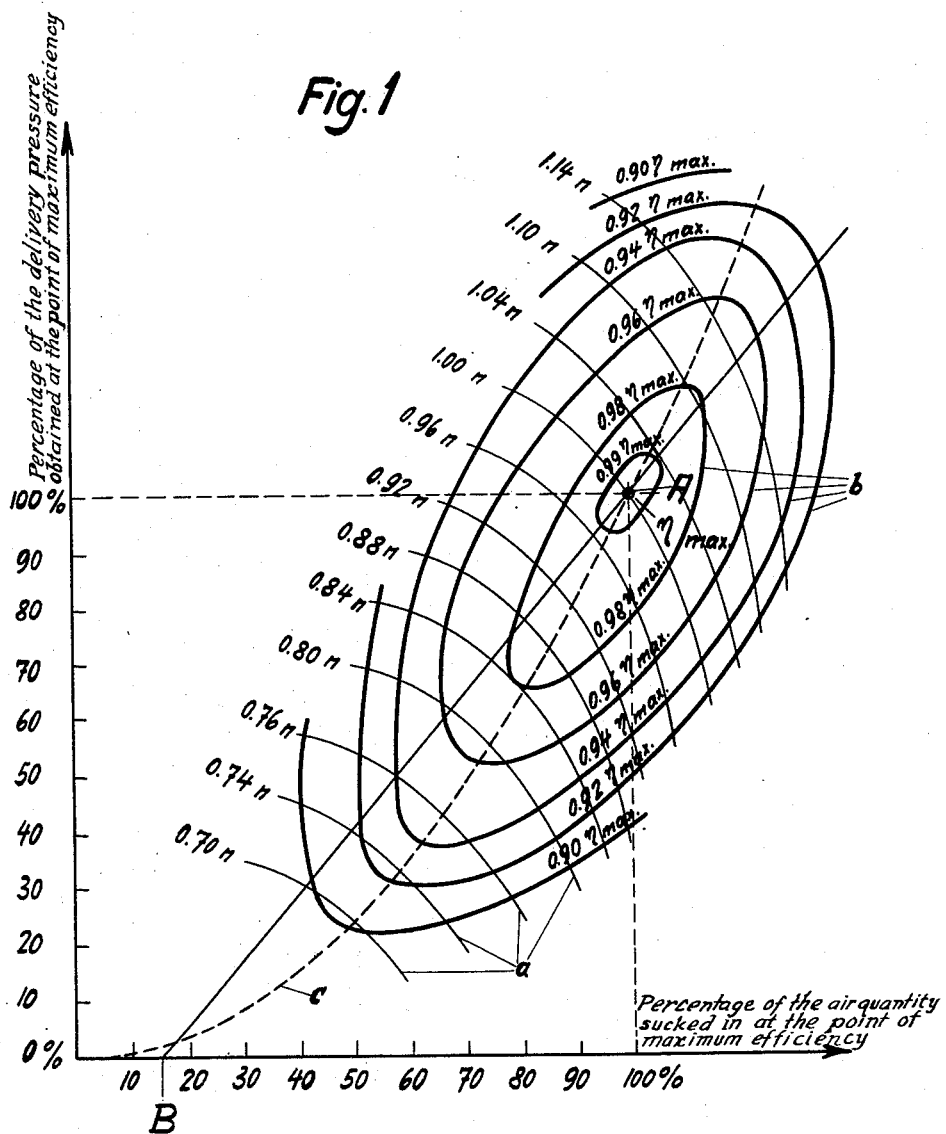

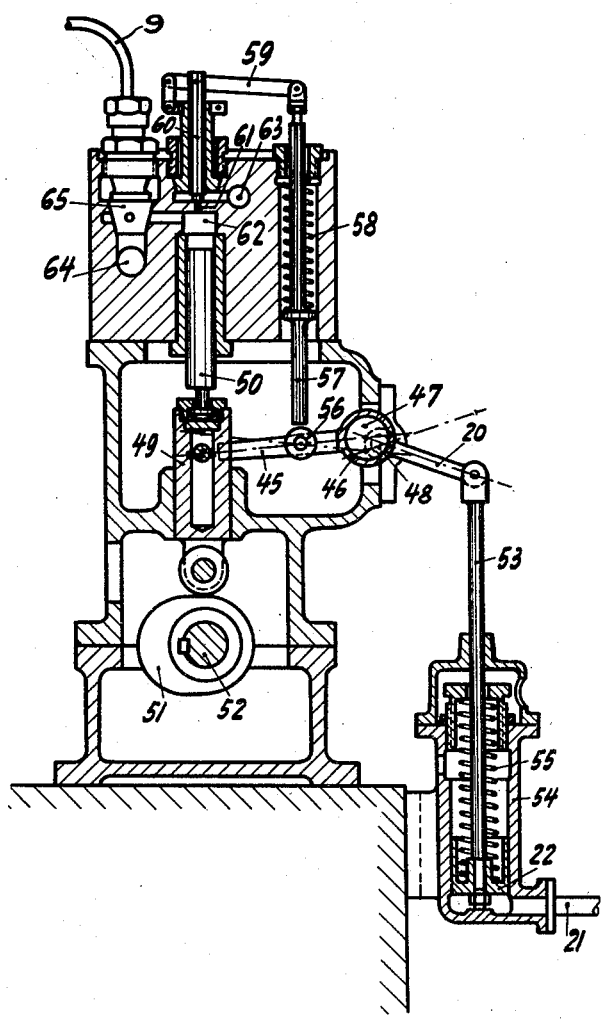

Patented Sept. 24, 1935

2,015,072

UNITED STATES PATENT OFFICE 2,015,072

REGULATION OF EXPLOSION TURBINE PLANTS

Hans Holzwarth, Dusseldorf, Germany, assignor to The Holzwarth Gas Turbine Co., San Francisco, Calif., a corporation of Delaware Application December 30, 1931, Serial No. 583,880
In Germany January 2, 1931

15 Claims. (Cl. 60—49)

The present invention relates to an improved method of and apparatus for regulating compound explosion turbines wherein explosion gases are intermittently generated in one or more constant volume explosion chambers with the aid of combustion-supporting compressed charging air and discharged in puffs against an explosion turbine rotor against a superatmospheric pressure, the remaining available energy of the gases being then utilized in or more continuous current gas turbines.

The present invention has for its object to provide an improved method of control which does not involve changing the cycle frequency of the explosion chambers and thus does not resort to the more or less complicated devices for altering the cycle frequency. Such object is accomplished in accordance with the present invention while maintaining constant the air delivered by the compressor per unit of time, measured at the pressure and temperature at which it is introduced into the combustion chambers, over the whole range of regulation, by keeping the cycle frequency and the number of chambers in operation unchanged. A mode of control of this type may be carried out with very simple structural elements, is extremely reliable and produces good efficiency.

In the case of stationary plants, in which the explosion turbine is an available output-producing prime mover like the continuous current turbines connected therewith and is advantageously located upon a common shaft with the generator and the continuous current turbines, changes in the rotational speed of the separate engine which drives the compressor must be brought about in order to carry out my new regulating process. For this reason the rotational speed of the driving machine of the compressor is, in a further development of the inventive idea, varied in dependence upon the fluctuations in the rotational speed of the explosion turbine. It is already known that the compressor may advantageously be driven by a steam turbine because with the waste heat of the turbine plant as much steam can be generated as is necessary for driving a turbine which will yield the power needed for driving the compressor. In such plants the speed of the driving steam turbine of the compressor is varied in dependence upon the positions of a steam inlet member actuated from the adjustable element of the governor of the explosion turbine. It is therefore unnecessary to employ a separate speed regulator for the driving engine of the compressor. With falling load on the generator the governor of the explosion turbine may close, for example, in a steam-drive turbo-compressor, the steam inlet member of the steam turbine, so that the steam turbine and compressor run more slowly and supply the charging air in such changed condition that the output of the explosion turbine and its continuous current turbine corresponds to the needs of the generator at the new load.

The method of regulation forming the subject matter of the present invention, wherein the quantity of air delivered by the compressor per unit of time, measured at the pressure and temperature at which it is introduced into the explosion chambers, is maintained constant throughout the range of regulation by maintaining the cycle frequency and the number of working chambers unchanged, must take into account the peculiarity that equality between the available output of the steam turbine and the energy requirement of the compressor exists only at a definite charging air pressure. Above this pressure the energy requirement of the compressor is greater than the available turbine capacity, while below such pressure the available output of the steam turbine is greater than the energy requirement of the compressor. These inequalities can be equalized, for example, by arranging an asynchronous motor upon the compressor shaft and an additional steam turbine upon the generator shaft so that at loads above the capacity determined by the point of intersection of the curve of available steam turbine output and the curve of energy requirement of the compressor, the compressor receives an additional driving torque from the compound turbine, while at loads below the said capacity the superfluous steam delivers energy to the generator shaft through the additional steam turbine. The method proposed by the present invention is, however, simpler as in such method, under conditions below the rated capacity of the driving engine of the compressor, the excess compressed air delivered by the latter is made useful for generating power directly, particularly by introducing the same into the continuous current turbine or turbines of the compound turbine for doing work therein. Under "rated capacity" is to be understood the capacity determined by the point above described, so that regulation is to be effected only below such capacity.

In carrying out the present invention there results a delivery of an excess of air throughout the whole range of regulation with the exception of the normal load. The excess air must be charged under suitable regulation in dependence upon the pressure of the charging air in order that the same volume of charging air, measured at the temperature and pressure at which it is supplied to the combustion chambers, is conducted to the explosion turbine. If control of the excess air is, however, effected not only in dependence upon the pressure of the charging air but also in dependence upon the speed fluctuations of the explosion turbine, the sensitivity of the regulating process is increased because the response to the new regulating condition is accomplished not first circuitously through the speed variations of the driving engine of the compressor and through the correspondingly changed charging air pressure, but directly by the speed variations of the explosion turbine which are primarily determinative of such secondary variations.

It has already been mentioned that during partial loads the excess air is introduced into the continuous current turbines for doing work therein. If the total quantity of steam were introduced into the turbine through a steam inlet member controlled in response to speed fluctuations of the explosion turbines in those plants wherein the power for driving the compressor is generated by a steam turbine, the quantity of steam available for the production of excess compressed air would be throttled. In a further development of the invention, steam is conducted to the driving steam turbine of the compressor, which steam is not regulated by a steam inlet member actuated in dependence upon the speed fluctuations of the explosion turbine, as soon as the pressure in the steam generator has reached a definite value, preferably full boiler pressure. Such a feed of steam can be accomplished, for example, by a suitably loaded overflow member arranged in the steam conduit.

My invention will be further described in connection with the accompanying drawings which illustrate by way of example an embodiment of the invention. In said drawings, Fig. 1 shows the characteristics of a rotary compressor; while Fig. 2 illustrates schematically an arrangement for carrying out my improved method of regulation; and Fig. 3 is a section through the fuel pump and its regulating mechanism on an enlarged scale.

In Fig. 1 the abscissæ represent the sucked-in quantities of air, while the ordinates correspond to the delivery pressure, both measured in percent of the rated capacity. The diagram shows the throttling curves $a$, that is, the lines of uniform rotational speed, which are determined by varying the quantity of air supplied by changing the adjustment of a throttling member arranged in the pressure conduit while the rotary speed $n$ of the compressor remains unchanged, and noting the corresponding values of the quantity delivered and the delivery pressure. In addition to these characteristics the diagram shows also the curves $b$ of constant efficiency. The letter A indicates the most favorable conditions of operation of the compressor, from which point a fall in efficiency occurs in all directions. Finally, there is shown in dotted line the parabola $c$ which connects the lower crown points of the efficiency curves. If the speed of the compressor were changed in accordance with this parabola there would be obtained the greatest variations in the pressure of the delivered compressed air with a given change in the delivered weight of air with minimum departures from the best efficiency represented by the point A. Such a speed regulation of the compressor would, however, require rather complicated apparatus, even if it should be at all practical; whereas according to the invention a particularly simple regulating process is sought. If, on the other hand, the quantities of air supplied per unit of time by the compressor, measured at the pressure and temperature at which it is delivered into the combustion chambers is, in accordance with the invention, maintained uniform while the cycle frequency and number of chambers in operation are kept unchanged throughout the range of regulation, the new method of regulation is characterized in the characteristic of the rotary compressor by the line A—B. It will be seen that this straight line runs comparatively near to the parabola $c$, so that in carrying out my improved regulation considerable changes in the condition of the charging air can be accomplished with comparatively small changes in efficiency; in other words, my improved method of regulation leads to a fairly high degree of efficiency even at rather small partial loads.

Figure 2:
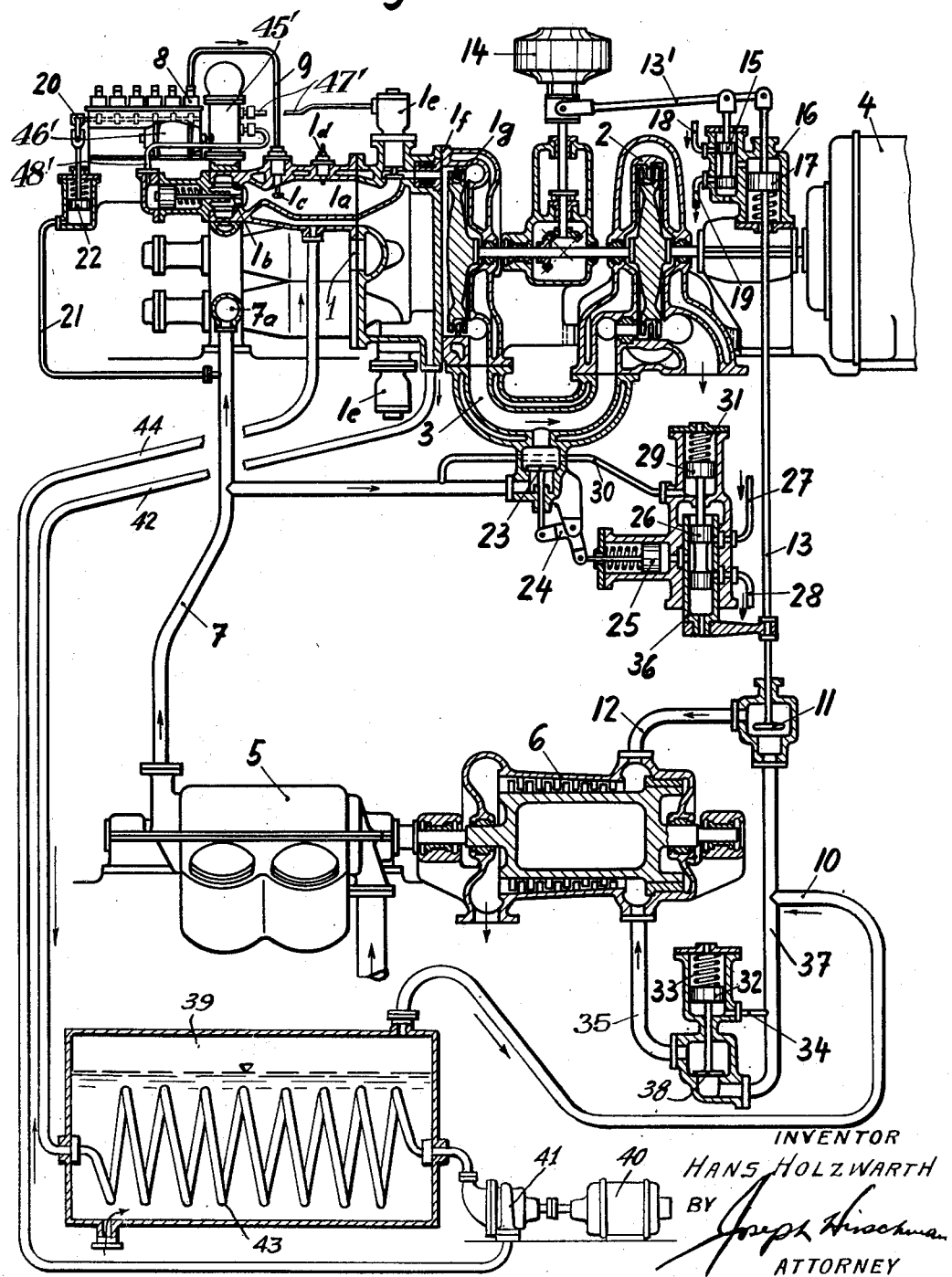

Fig. 2 shows a satisfactory arrangement for carrying out my invention. The explosion turbine is indicated generally at 1, the same comprising a plurality of explosion chambers 1a each provided with a hydraulically controlled air inlet valve 1b and a fuel inlet member 1c, the explosive charges being periodically ignited by means of a suitably timed ignition device 1d of any known construction. The discharge of the high pressure explosion gases from the chambers is effected by means of hydraulically operated exhaust or nozzle valves 1e which may be controlled in a manner similar to the valves 1b, the explosion gases being directed by nozzles 1f against an explosion or impulse turbine rotor 1g. The gases exhausting from the latter are conducted to the continuous current gas turbine 2 through a conduit 3. The generator is indicated at 4, the compressor at 5 and the steam turbine for driving the compressor is shown at 6, such turbine being driven by steam which is generated with the aid of the waste heat of the compound gas turbine 1, 2 (e. g. the heat passing into the cooling jackets of the explosion chambers). An arrangement for generating steam in this manner is indicated in Fig. 2 wherein oil having a boiling point above 200° C. is circulated through a boiler 39 and through the cooling jackets of the gas turbine, by a pump 41 driven by an electric motor 40. The oil abstracts heat from the hot walls of the gas turbine, and particularly of the explosion chambers thereof, and flows through the conduit 42 to a coil 43 in the boiler 39 and gives up its abstracted heat to the water in such boiler, so that the water is evaporated. The cooled oil returns through the pump 41 and conduit 44 to the turbine 1. Apparatus for generating steam in this manner is known and is shown in British Patent 296,154. The compressed charging air is conducted to the chambers 1a of the explosion turbine through a conduit 7 leading to an air manifold 7a which communicates with the valves 1b. The pressure of the charging air is normally higher than that prevailing in conduit 3. Fuel pumps are indicated at 8 and are connected with the respective inlet members 1c of the explosion chambers by conduits 9, of which only one is shown. The steam generated in the boiler 39 with the waste heat of the compound turbine 1, 2 is conducted to the turbine 6 by a collecting conduit 10.

In accordance with the invention, the speed of the steam turbine 6 and thereby the speed of the compressor 5 are varied in carrying out the regulation of the plant, in order to vary the pressure of the delivered air, while the volume of the charging air fed by conduit 7 to the explosion turbine 1, measured at the pressure and temperature at which such air is delivered into the explosion chambers, is kept constant throughout the range of regulation by keeping unchanged the number of cycles per chamber per unit of time and the number of chambers in operation, while at the same time the specific heat content of the explosive mixtures fed to the chambers is kept constant. This speed regulation of the turbine is carried out by the steam inlet member 11 which is arranged between the collector conduit 10 and the feed conduit 12 leading to the turbine 6. The control of the steam inlet member is accomplished in direct dependence upon the speed fluctuations of the explosion turbine 1 by suitably actuating the member 11 by means of the adjustable elements 13, 13' of the governor 14 of the explosion turbine. To prevent unpermissible back pressures upon the governor 14, the elements 13, 13' are made to act first upon the control disc 15 of a servo-motor 16. Depending upon the position of the control disc 15, the piston 17 of the servo-motor is placed under the influence of a pressure medium admitted at 18 or relieved of such medium through the conduit 19. If now, for example, the load on the generator is reduced, the governor 14 of the explosion turbine 1 responds quickly to the immediately resulting change in speed, whereupon the control disc 15 is raised somewhat so that the pressure medium is admitted through conduit 18 to act upon the piston 17 of the servo-motor. In response to the downward movement of the piston 17, the valve 11 throttles the feed supply to the steam turbine 6 to a corresponding degree, so that the speed of the turbine 6 and hence of the compressor 5 falls. The reduction in speed is so predetermined by suitable dimensioning of all the influencing factors that the compressor delivers the charging air in such altered condition that at the changed load on the generator the output of the compound gas turbine corresponds to the requirements of the generator. Upon fall of the piston 17, the disc 15, which is connected with the horizontal member 13', is lowered into the ineffective neutral position, so that the inlet member 11 maintains its position corresponding to the load condition until a further change in the load on the generator 4 leads to a different position of the control mechanism. The control member 20 of the fuel pumps 8 which regulates the supply of fuel in known manner is under the influence of the charging air pressure through the conduit 21 and the piston 22 so that, independently of the changes in the condition of the charging air occurring in consequence of the regulation of the plant, a constant ratio between the fuel and air in the explosive charges introduced into the explosion chambers of the plant is maintained. The fuel pump and its regulating mechanism are described more in detail below.

The mechanism so far described does not yet take into account the circumstance which, due to the fact that my improved method of regulation involves a variation in the pressure of the air charged into the explosion turbine, is of peculiar importance in such method of regulation, namely, that equality between the available capacity of the steam turbine 6 and the energy requirement of the compressor 5 exists only at a definite charging air pressure. In accordance with the invention it is proposed that in the conditions of regulation below the rated capacity of the turbine 6, the excess air compressed by the compressor 5 is made useful for doing work by introducing the same, for example, into the continuous current turbine 2 to perform work therein. By "rated capacity" is to be understood the capacity at which the curve of the available steam turbine capacity cuts the curve of the compressor energy requirement. In particular the proposed arrangement does not take into consideration the fact that upon throttling of the steam by the inlet member 11 during partial loads an excess of steam is created which can be profitably utilized. This steam can, for example, be stored in the steam space of the boiler 39 in known manner and again utilized at a peak load. If, however, this excess steam is, in accordance with the invention, employed for generating surplus air which can be utilized in the continuous current gas turbine, the special apparatus for storing such steam is eliminated. The accumulating capacity of a steam boiler which utilizes the waste heat of the gas turbines should always be taken into consideration as much as possible. It would therefore not be correct to conduct all of the generated steam without regulation to the steam turbine which drives the compressor and to undertake the regulation entirely by blowing off compressed air directly into the continuous current turbine. In such case the regulation would be slow and uneconomical. If the plant should be under full load, and is then suddenly relieved of load, the steam stored in the boiler would deliver its full working capacity with slow reduction of the steam pressure. This excess capacity which corresponds to the accumulating capacity of the boiler would be utilized rather uneconomically by blowing off the excess air into the continuous current gas turbine. It is more economical to keep the steam pressure in the boiler at full value and to hold the stored energy in readiness for future loads. In the case of a smaller load on the steam turbine, it would not be possible to increase the charging air pressure quickly to a corresponding degree, when sudden increases in the load occurred. Only when the full steam pressure is maintained in the boiler is sufficient energy accumulated to increase the charging air pressure suddenly.

The regulation of the excess air with maintenance of full boiler pressure is accomplished in accordance with the invention in the following manner. In addition to the steam inlet valve 11 actuated by the governor 14 of the explosion turbine 1 there is arranged a second steam inlet valve 38 in the steam by-pass conduit 37 which is directly connected with the collector conduit 10 in parallel with the valve 11. The valve 38 is provided with a control piston 32 which at one side thereof is under the influence of a compression spring 33, and upon the other side thereof is exposed to the pressure of the steam through the conduit 34. As soon as the steam pressure has reached a definite value, preferably somewhat above the full boiler pressure, the valve 38 opens automatically, so that the excess steam which does not pass into conduit 12 is conducted into turbine 6 through the steam conduit 35.

The valve 11 and the steam turbine 6 are preferably so dimensioned that when the valve 11 is completely open the full steam pressure will prevail in advance of the turbine when the whole plant is loaded up to the rated capacity. If the load on the generator 4 falls, then, as described above, the valve 11 is closed to a corresponding degree by the governor 14. As a result, the speed of the turbine 6 and of the compressor 5 falls, whereupon the charging air pressure and hence the speed of the explosion turbine 1 are reduced. If the fall in load lasts for only a short time then the control mechanism provided is sufficient, as the accumulating capacity of the steam boiler is utilized and suffices to take up the developed excess steam for a time. If, however, the reduction in load lasts for a longer period than that which corresponds to the accumulator capacity of the boiler, the steam pressure in the boiler will tend to rise to an unpermissible degree. When this occurs, the valve 38 opens automatically and lets the surplus steam flow into the steam turbine through the conduit 35. As the speed of the turbine and compressor is in this way increased the air charging pressure rises and likewise the speed of the explosion turbine. To prevent this, an overflow valve 23 is arranged between the air supply conduit 7 to the turbine 1 and the connecting conduit 3 for the combustion gases between the two stages of the compound gas turbine. The valve 23 is controlled by a piston 25 through a bell-crank lever 24. Depending upon the position of a sleeve 36 which is moved by the adjustable member 13, the piston 25 is placed under the influence of a pressure medium fed by conduit 27 or relieved of such medium through a conduit 28. If now an increase in the speed of the compressor and hence of the air pressure occurs due to the admission of surplus steam by valve 38 into turbine 6 and the explosion turbine thereby accelerated, the governor will, as already described, close the valve 11 still further. This action of the governor is at all times without influence upon the speed of the compressor 5 since the steam throttled by valve 11 can flow through valve 38. Upon movement of valve 11 and of the associated element 13, the sleeve 36 is also moved and thereby the overflow valve 23 opened. In order to limit the opening of the valve 23 to the proper degree, a control of the valve is necessary which in the form of the invention illustrated is accomplished by the action of the charging air pressure itself upon the piston 29 through the conduit 30. This control mechanism operates in the following manner:

By movement of the sleeve 36 by element 13 a pressure medium is conducted by conduit 27 to the right side of piston 25, whereupon the overflow valve 23 is opened upon movement of the bell-crank lever 24. The charging air pressure falls and permits the spring 31 to move downwardly the piston 29 and the disc 26 fixed thereto. The pressure medium in conduit 27 is thus cut off from the piston 25 upon such downward movement of the disc 26 and according to requirements is discharged through the pipe 28. The overflow valve 23 is thus maintained in the position corresponding to the condition of stability by the control mechanism.

The mechanism for controlling the fuel feed in dependence upon the air pressure is shown in greater detail in Fig. 3, which corresponds to Fig. 2 of my Patent Number 1,982,666, issued December 4, 1934. The regulating mechanism includes an oscillating lever 45 provided with an eye 46 through which it is journalled upon a shaft 47. The latter is rotable about the eccentrically positioned pivots or studs 48 at the ends of such shaft, only one such pivot being illustrated. The inner end of the lever 45 is bifurcated and is articulated with the guide 49 of the fuel pump plunger 50 and partakes of the up and down movement of the latter. This movement is effected in known manner by means of cams 51 mounted upon a shaft 52 driven by a suitable motor. The pivots 48, about which the shaft 47 is eccentrically journalled, are rigidly connected with the control member or arm 20 pivoted to a rod 53 which is connected to the piston 22 movable in a cylinder 54. The piston 22 is at one side under the influence of a compression spring 55 whose pressure may be predetermined, while upon its other side it is under the influence of the charging air pressure through conduit 21. The latter, as already indicated, is connected with the conduit 7 which conducts pressure air from the compressor to the manifold 7a. The space 18 under the piston 22 is thus under the pressure of the charging air.

The oscillating lever 45 carries a roller 56 through which it operates an adjustable rod 57 against the pressure of a spring 58. The upper end of rod 57 is pivoted to a lever 59 whose other end is pivoted to a fixed part of the machine. The lever 59 is pivotally connected with a piston valve 60 controlling an overflow opening 61 leading from the space 62 above the pump plunger 50 into an overflow well 63 from which any by-passed fuel is returned to the fuel pump. During the suction stroke of the plunger 50, oil is sucked into the space 62 from the supply conduit 64 through a suitable check valve, while upon the pressure stroke of the plunger, the oil is discharged into the conduit 9 through a check valve 65. The amount of oil forced into the conduit 66 is dependent upon the adjustment of the by-pass mechanism 45, 47, 48, 57.

The operation of the mechanism so far described is as follows: Under the influence of the pressure of the spring 55 on the one side and of the pressure of the charging air on the other, the piston 22 assumes a definite position. The eccentrically mounted shaft 47, which is connected with piston 22 through rod 53 and arm 20, thus also assumes a definite position, so that the lever 45 oscillates about a definite center. Corresponding to the position of this center, the overflow opening 61 opens at definite instants by operation of valve 60 through rod 57, so that predetermined amounts of fuel are charged by the plunger 50 into the valve 65 and fuel conduit 9 leading to the fuel inlet valve of the combustion chamber. By suitable selection of the bore of cylinder 54 and of the strength of spring 55, it becomes possible to insure such feed of fuel at a definite charging air pressure as will maintain the desired specific heat content of the charge, for example, 400 kilogram-calories per cubic meter. As soon as the charging air pressure changes, the position of the piston 22 also changes and consequently also that of the eccentric shaft 47. The other influencing factors, namely, the length of the levers, the eccentricity of the shaft 47, the lever ratio of lever 45, etc. can be so determined that the same specific heat content in the charge is maintained at the different air pressures.

It will be understood that suitable mechanism is provided to operate the valves of the explosion chamber in the proper sequence. Fig. 2 shows a valve timing mechanism in the form of a hydraulic distributor 45' which controls the feed of pressure oil through pipes 47' and 48' to the operating piston of the valves 1a and 1b, respectively. The distributor may be driven by an electric motor 46' and is of the type disclosed in greater detail in United States Patent No. 1,763,154.

I claim:

1. The method of regulating explosion turbine plants which include an explosion turbine having one or more constant volume explosion chambers, a compressor for delivering compressed air to said explosion chamber or chambers, and a machine for driving said compressor mounted independently of the turbine, said method comprising varying the pressure of the air delivered by the compressor, maintaining unchanged throughout the range of regulation the volume of charging air delivered per unit of time by said compressor, measured at the pressure and temperature at which it is delivered into the explosion chambers, by maintaining constant the cycle frequency and the number of explosion chambers in operation, and varying the supply of fuel in relation to the change in the pressure of the air to keep substantially constant the ratio of fuel to air in the explosive charges introduced into the chambers.

2. The method according to claim 1, wherein the pressure of the air is varied by changing the speed of the driving machine of the compressor in dependence upon the speed fluctuations of the explosion turbine.

3. The method of regulating explosion turbine plants which include an explosion turbine having one or more constant volume explosion chambers, a continuous current turbine, a conduit for conducting the gases exhausting from the first turbine into the second turbine, a compressor for delivering compressed air to said explosion chamber or chambers, and a machine for driving said compressor mounted independently of the turbine, said method comprising varying the pressure of the air delivered by the compressor, maintaining unchanged throughout the range of regulation the volume of charging air delivered per unit of time by the compressor, measured at the pressure and temperature at which it is delivered into the explosion chambers, by maintaining constant the cycle frequency and the number of explosion chambers in operation, varying the supply of fuel in relation to the change in the pressure of the air so as to keep substantially constant the ratio of fuel to air in the explosive charges introduced into the chambers, and introducing into the continuous current turbine excess air delivered by the compressor for doing work in such turbine during the conditions of regulation below the rated capacity of the driving machine of the compressor.

4. The method according to claim 3 wherein the excess air introduced into the continuous current turbine is regulated in dependence upon the pressure of the charging air.

5. The method according to claim 3 wherein the excess air introduced into the continuous current turbine is regulated in dependence upon the pressure of the charging air and likewise in direct dependence upon the speed fluctuations of the explosion turbine.

6. The method of regulating explosion turbine plants which include an explosion turbine having one or more constant volume explosion chambers, a compressor for delivering compressed air to said explosion chamber or chambers, and a steam turbine for driving said compressor mounted independently of the explosion turbine, said method comprising varying the pressure of the air delivered by the compressor, maintaining unchanged throughout the range of regulation the volume of charging air delivered per unit of time by the compressor, measured at the pressure and temperature at which it is delivered into the explosion chambers, by maintaining constant the cycle frequency and the number of explosion chambers in operation, varying the supply of fuel in relation to the change in the pressure of the air so as to keep substantially constant the ratio of fuel to air in the explosive charges introduced into the chambers, regulating the flow of steam to the steam turbine in dependence upon the speed fluctuations of the explosion turbine, and charging the excess steam into said steam turbine when the pressure thereof has risen to a predetermined value.

7. The method of regulating explosion turbine plants which include an explosion turbine having one or more constant volume explosion chambers, a continuous current turbine, a conduit for conducting the gases exhausting from the first turbine into the second turbine, a compressor for delivering compressed air to said explosion chamber or chambers, and a steam turbine for driving said compressor mounted independently of the explosion turbine, said method comprising varying the pressure of the air delivered by the compressor, maintaining unchanged throughout the range of regulation the volume of charging air delivered per unit of time by the compressor, measured at the pressure and temperature at which it is delivered into the explosion chambers, by maintaining constant the cycle frequency and the number of explosion chambers in operation, varying the supply of fuel in relation to the change in the pressure of the air so as to keep substantially constant the ratio of fuel to air in the explosive charges introduced into the chambers, introducing into the continuous current turbine the excess air delivered by the compressor for doing work in such turbine during the conditions of regulation below the rated capacity of said steam turbine, regulating the flow of steam to the steam turbine in dependence upon the speed fluctuations of the explosion turbine, and charging the excess steam into said steam turbine when the pressure thereof has risen to a predetermined value.

8. An explosion turbine plant comprising an explosion turbine including a rotor and one or more constant volume explosion chambers having inlet and outlet valves, a compressor for delivering compressed air to said explosion chamber or chambers mounted independently of said explosion turbine, mechanism for feeding fuel into said chambers, a timing device for operating the valves of said chambers, means for driving said timing device at uniform speed and thereby effect operation of said chambers at constant cycle frequency, a machine for driving said compressor, means responsive to the speed of the explosion turbine, mechanism controlled by said last-mentioned means and associated with the compressor for varying the pressure of the air delivered by the compressor while the cycle frequency and the number of explosion chambers in operation are maintained constant to keep constant the volume of air supplied by the compressor, measured at the pressure and temperature at which it is charged into the explosion chambers, and means for regulating said fuel feeding mechanism to maintain constant the ratio of fuel to air in the explosive charges.

9. An explosion turbine plant as set forth in claim 8, including a control device operative to vary the speed of the compressor in dependence upon the speed fluctuations of the explosion turbine rotor.

10. An explosion turbine plant comprising an explosion turbine including a rotor and one or more constant volume explosion chambers, a compressor for delivering compressed air to said explosion chamber or chambers, mounted independently of the explosion turbine, an air conduit between said compressor and said chambers, a steam turbine for driving said compressor, a steam conduit leading to said steam turbine, a governor for the explosion turbine, and mechanism for regulating the speed only of said steam turbine and comprising a valve located in said steam conduit and operatively associated with said governor.

11. An explosion turbine plant as set forth in claim 8, including a continuous current gas turbine, a conduit for conducting to such turbine the gases exhausting from the explosion turbine, and a conduit connected with the compressor for conducting to the continuous current turbine the excess of air during the conditions of regulation below the rated capacity of the driving machine of the compressor.

12. An explosion turbine plant as set forth in claim 8, including a continuous current gas turbine and a conduit for conducting thereto the gases exhausting from the explosion turbine, and mechanism operative to feed excess air into said conduit in dependence upon the pressure of the charging air.

13. An explosion turbine plant as set forth in claim 8, including a continuous current gas turbine and a conduit for conducting thereto the gases exhausting from the explosion turbine, and mechanism operative to feed excess air into said conduit in dependence upon the pressure of the charging air, and means responsive to the fluctuations in speed of the explosion turbine for controlling said mechanism.

14. An explosion turbine plant as set forth in claim 10, including a steam valve mechanism arranged to charge the excess steam which does not pass through the first-mentioned valve into the steam turbine when the pressure of such steam has risen to a predetermined value.

15. An explosion turbine plant as set forth in claim 8, including a continuous current gas turbine and a conduit for conducting thereto the gases exhausting from the explosion turbine, said mechanism operative to feed excess air into said conduit in dependence upon the pressure of the charging air, and means responsive to the fluctuations in speed of the explosion turbine for controlling said mechanism, said mechanism including a control member under the influence of the charging air and arranged to control the flow of a pressure medium for regulating the excess air valve, and a slide member directly controlled by the governor for controlling said control member.

HANS HOLZWARTH.